(12) United States Patent
Holmen et al.

(10) Patent No.: US 6,719,146 B2
(45) Date of Patent: Apr. 13, 2004

(54) SORTING DEVICE FOR CONTAINERS

(75) Inventors: Kristian Holmen, Asker (NO); Lars Aanestad, Tranby (NO)

(73) Assignee: Tomra Systems ASA, Asker (NO)

( * ) Notice: Subject to any disclaimer, the term of this patent is extended or adjusted under 35 U.S.C. 154(b) by 0 days.

(21) Appl. No.: 10/333,345

(22) PCT Filed: Aug. 1, 2001

(86) PCT No.: PCT/NO01/00328

§ 371 (c)(1),
(2), (4) Date: Jan. 17, 2003

(87) PCT Pub. No.: WO02/12096

PCT Pub. Date: Feb. 14, 2002

(65) Prior Publication Data

US 2003/0141167 A1 Jul. 31, 2003

(30) Foreign Application Priority Data

Aug. 4, 2000 (NO) .............................. 20003975

(51) Int. Cl.⁷ ........................... B65G 47/84; B65G 29/00
(52) U.S. Cl. ....................................... 209/522; 209/655
(58) Field of Search ............................... 209/522, 523, 209/655, 656; 198/370.07, 598, 394, 442, 364, 890

(56) References Cited

U.S. PATENT DOCUMENTS

| | | | | |
|---|---|---|---|---|
| 2,656,964 A | * | 10/1953 | Detrez .................... 198/345.1 |
| 4,200,183 A | * | 4/1980 | Riggs ..................... 198/867.06 |
| 4,388,989 A | * | 6/1983 | Edmunds et al. ......... 198/346.2 |
| 4,428,474 A | | 1/1984 | Gau et al. |
| 4,858,767 A | * | 8/1989 | Myers et al. ................. 209/3.1 |
| 5,186,887 A | * | 2/1993 | Yaginuma .................... 376/248 |
| 5,193,691 A | * | 3/1993 | Chong ......................... 209/600 |
| 5,248,102 A | * | 9/1993 | Bohn ........................... 241/99 |
| 5,249,689 A | * | 10/1993 | Wergeland et al. ......... 209/546 |
| 6,112,904 A | * | 9/2000 | Ajo ............................. 209/523 |
| 6,533,099 B2 | * | 3/2003 | Bonham et al. ........ 198/370.07 |

FOREIGN PATENT DOCUMENTS

| | | |
|---|---|---|
| DE | 3418737 A1 | 11/1985 |
| EP | 0228351 A1 | 7/1987 |

* cited by examiner

Primary Examiner—Douglas Hess
(74) Attorney, Agent, or Firm—Rodman & Rodman

(57) ABSTRACT

A device for controlling the conveying direction of empty liquid containers of any cross section, where the conveying direction is either through a portion of the device, or sideways away from the conveying path and the containers are supported in a horizontal position, the device comprising a rotatable drum arranged above the conveying path and with its axis of rotation in the direction of the conveying path, wherein the drum has at least one container chamber forming an opening in the drum, at least one container guide plate, and a container ejection mechanism arranged in connection with the chamber. In operation, the ejector empties the container from the chamber when the chamber opening has moved passed an upper edge of the guide plate and thus with force will thrust a container out of the chamber opening.

6 Claims, 5 Drawing Sheets

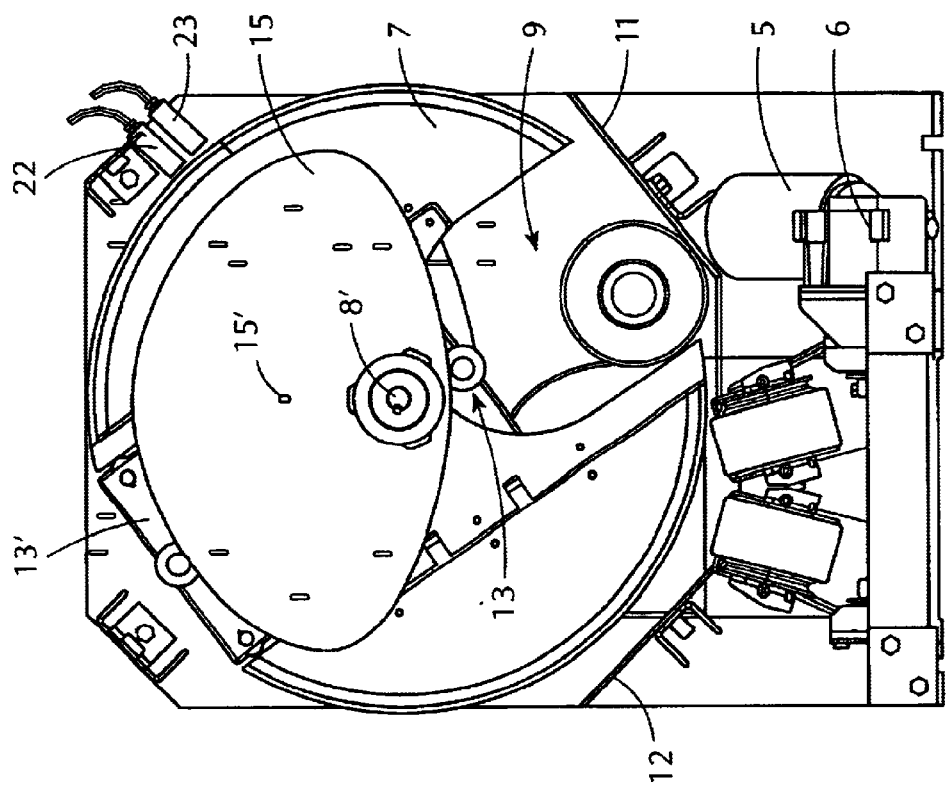
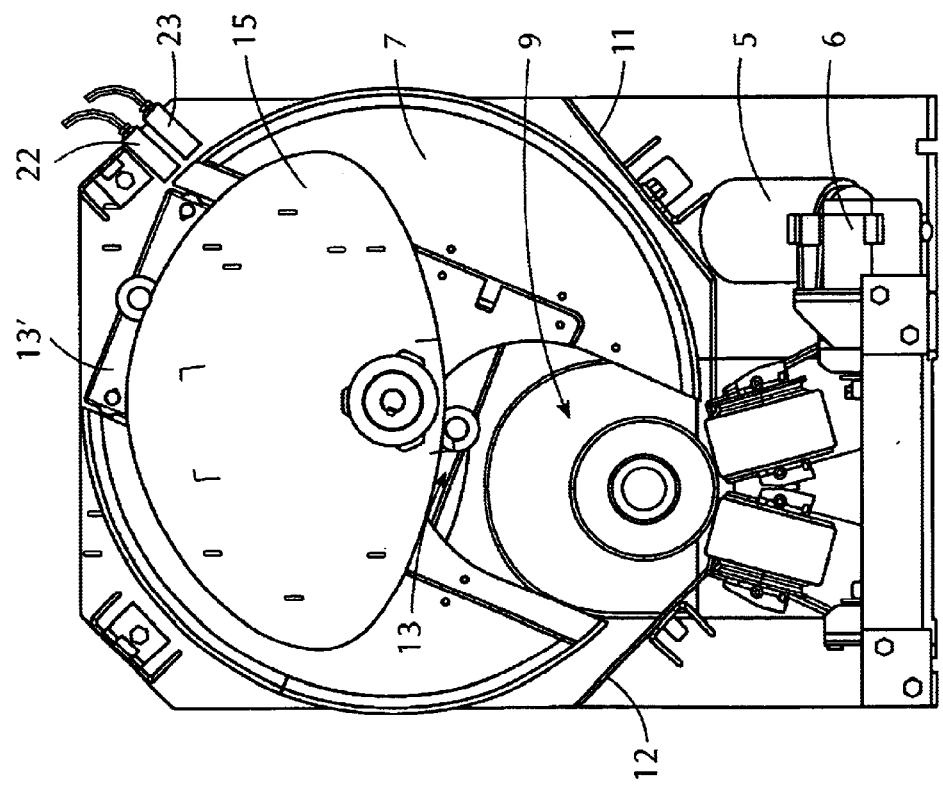

SORTING DEVICE FOR CONTAINERS

The present application relates to a device for sorting liquid containers in the form of empty beverage packaging, and more specifically for controlling the conveying direction of such containers, for example cans or bottles of any cross-section, where the conveying direction is either along a conveying path through a portion of the device, or sideways away from the conveying path where the containers are supported in a horizontal position.

A number of types of sorting devices for moving liquid containers either along a straight path or sideways away from such a conveying path are already known. In particular when the liquid containers are conveyed in a horizontal position, it is not an entirely simple matter to move the liquid containers sideways away from the conveying path. This is especially true in those cases where there is also a need to move the liquid container sideways away from and at a level above the conveying path in a safe manner.

Accordingly, it is an object of the present application to solve some of the problems associated with the prior art, and according to the invention it is proposed that the device should comprise a drum that is rotatably arranged above the conveying path and with its axis of rotation in the direction of the conveying path, wherein the drum has at least one container-adapted chamber, through-going in the direction of the axis of rotation, with its opening at the periphery of the drum, and so that there is thus also a container cross-section adapted opening in each of the end walls of the drum, a container guide plate extending sideways and upwards from the conveying path along a portion of the circumference of the drum, and a container ejector mechanism arranged in connection with said chamber, where the mechanism is so adapted that on mechanical operation it will empty the chamber when, as a consequence of the rotation of the drum, the chamber opening has moved past an upper edge of the container guide plate, and thus with force will thrust a container lying in the chamber out of the chamber.

According to a further embodiment, the mechanism consists of a radially movable carriage in the drum, where the carriage forms the back wall of the chamber with its radially outermost portion, and a stationary guide disc at the ends of the drum, the carriage having a guide wheel or pulley that interacts with the circumference of the guide disc for mechanical control of the movement of the carriage when the drum rotates.

According a one particular embodiment of the device, the axis of rotation of the drum is offset sideways relative to the said conveying path.

The guide disc is advantageously given an oval or elliptical shape with its centre lying at a distance above the axis of the drum.

The invention will now be described in detail with reference to the attached drawings which show an exemplary embodiment that is non-limiting for the invention.

FIGS. 3–10 show the device with the front plate removed for clarity.

FIG. 3 is a front view of the device in a first working position.

FIG. 4 is a front view of the device in a second working position.

FIG. 5 is a perspective view of the device in the working position according to FIG. 3.

FIG. 6 is a perspective view of the device in the working position according to FIG. 4.

FIG. 7 is a front view of the device in a third working position.

FIG. 8 is a front view of the device in a fourth working position.

FIG. 9 is a perspective view the device in the working position according to FIG. 7.

FIG. 10 is a perspective view of the device in the working position according to FIG. 8.

Figure 2:
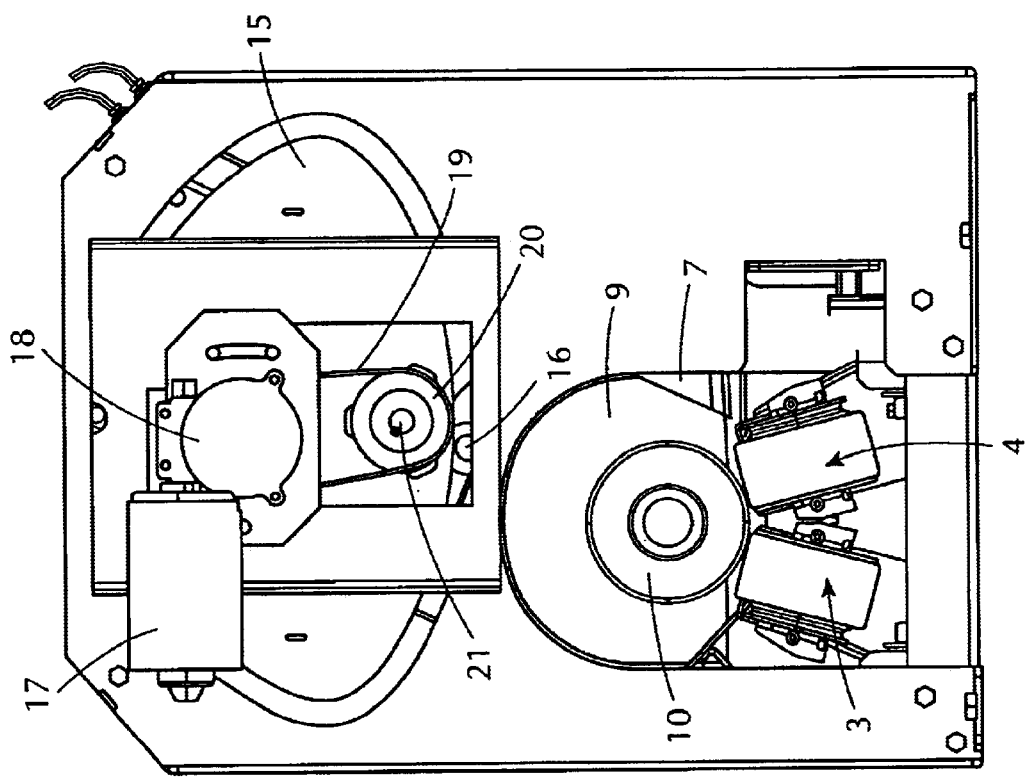
FIG. 2 is a first front view of the device according to the invention.
Figure 1:
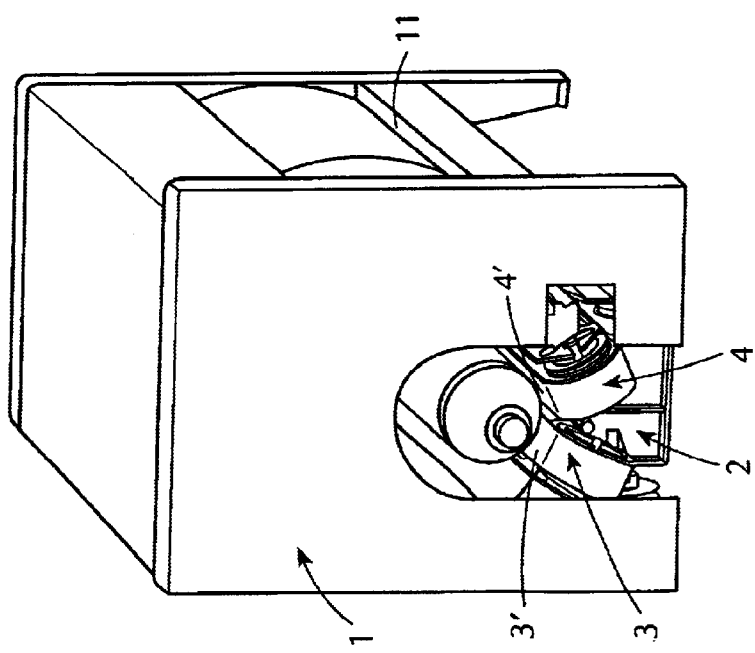
FIG. 1 is a perspective view of the device according to the invention.
Figure 6:
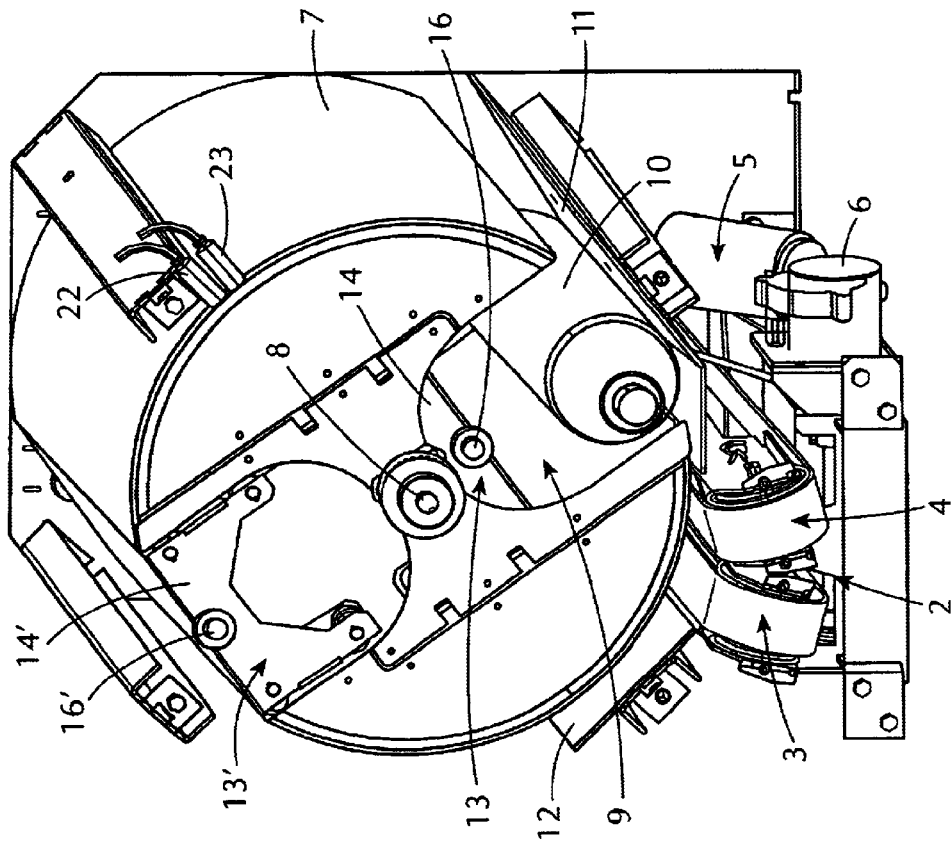
Figure 5:
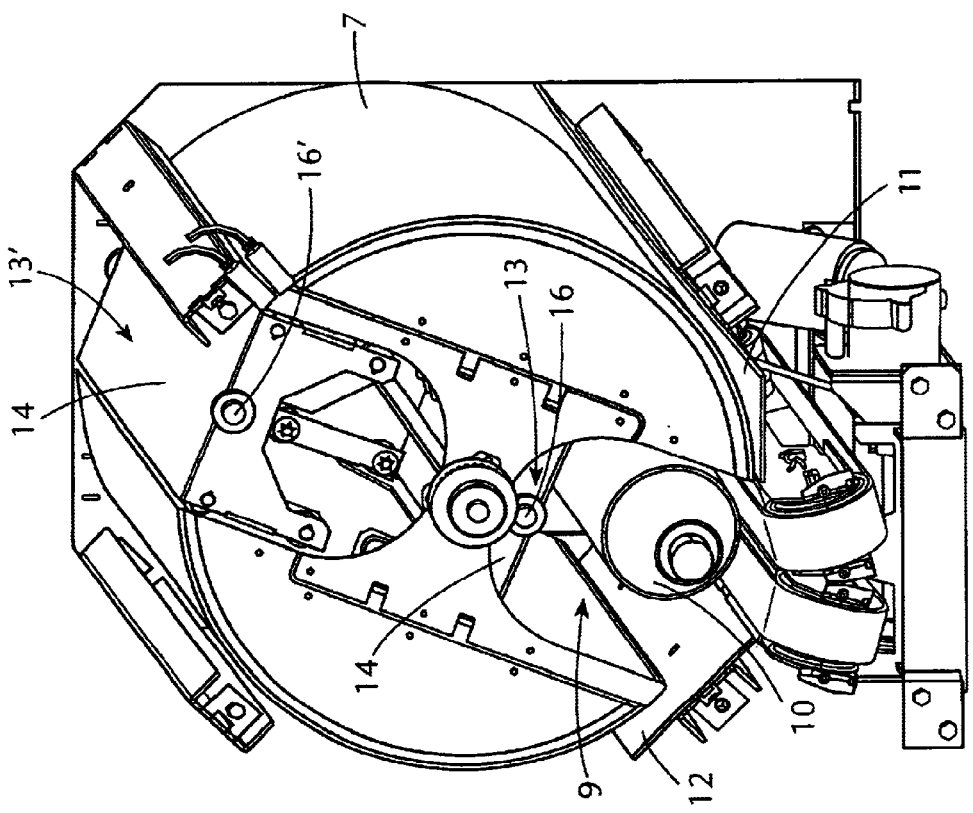
Figure 8:
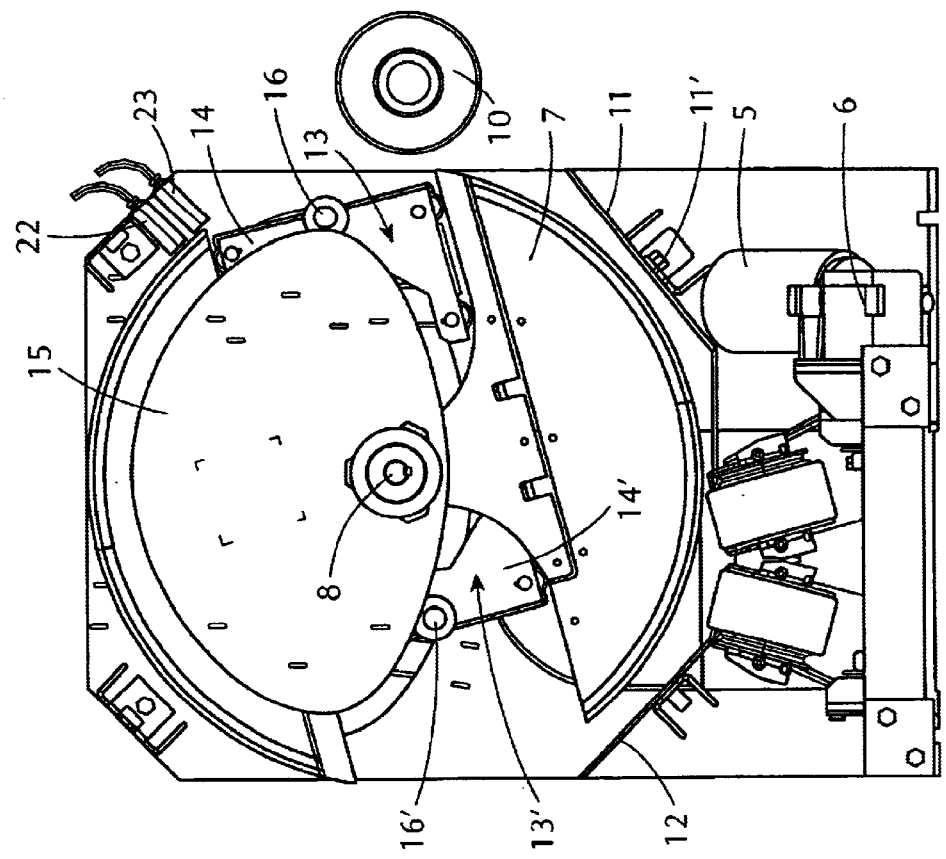

The device according to the invention has a housing 1 in which there is arranged a conveyor 2 having a first conveyor part 3 and a second conveyor part 4, where the conveyor parts 3, 4 with their conveyor belts 3', 4' form an angle relative to one another so that the conveyor 2 has a shallow V-shaped appearance.

A motor 5 drives the conveyor 2 consisting of the conveyor parts 3, 4 with their conveyor belts 3', 4'. The drive can expediently be provided via a gear 6 and, for example, via a belt drive or optionally via a worm drive, as described in Norwegian Patent Application No. 20003976, filed on the same date as this application.

In the figures, the drum that is rotatably arranged above the conveyor is indicated by means of the reference numeral 7.

Figure 7:
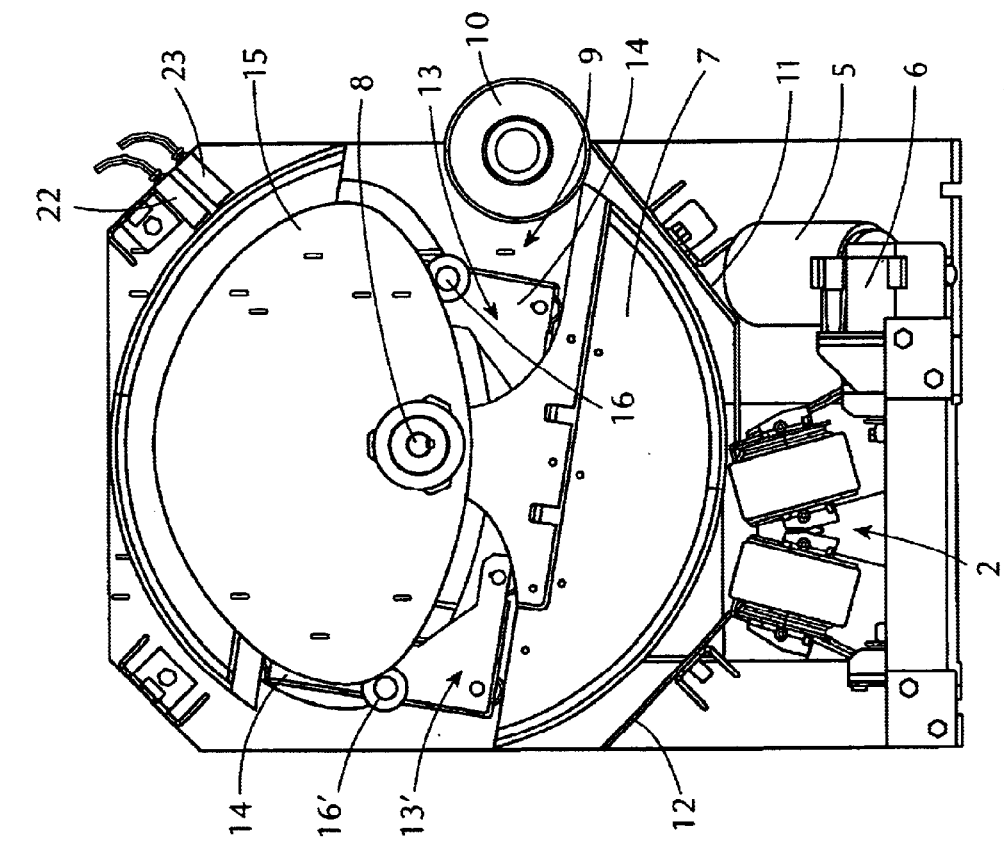
Figure 9:
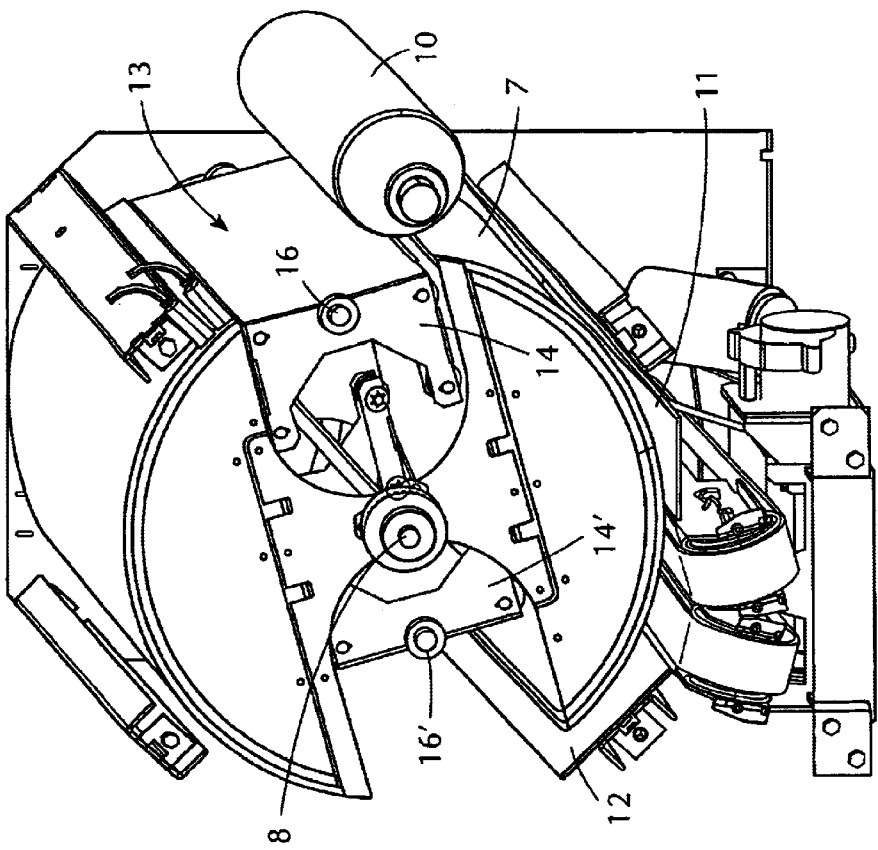
Figure 10:
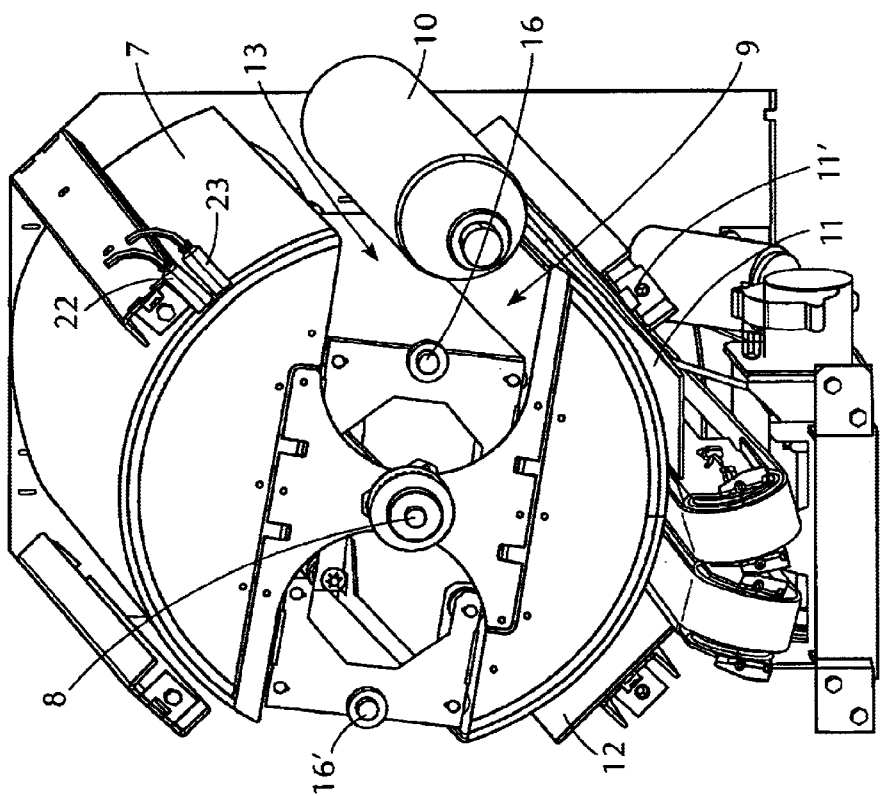

As can be seen quite clearly, the axis of rotation 8 of the drum lies in the direction of the conveying path 2. As is obvious in particular from FIGS. 3–6, but also from FIGS. 7 and 9, the drum has at least one container-adapted chamber 9, through-going in the direction of the axis of rotation, where the opening is at the periphery of the drum. The liquid container shown in the figures has been given the reference numeral 10. A container guide plate 11 extends sideways and upwards from the conveying path of the conveyor 2 along a portion of the circumference of the drum. In addition, a second container guide plate 12 may be arranged on the opposite side of the conveying path of the conveyor 2. A passing motion detector 22, respectively 23, can be arranged to detect the position of the drum 7 and its direction of rotation. The detectors can interact with markers (not shown) arranged on the surface of the drum.

Advantageously, a container ejecting mechanism 13, respectively 13' is provided in connection with the chamber 9. This mechanism is so adapted that on mechanical operation it will empty the chamber 9 when the chamber opening has moved past an upper edge of the container guide plate 11 or 12. Thus, as can be seen most clearly from FIG. 8, the container 10 is thrust with force out of the chamber 9 by radially movable carriage 14. It will be seen from the figures that the carriage 14 with its radially outermost portion forms the back wall of the chamber 9. A similar carriage 14' is also present, as indicated in FIGS. 3–10. A stationary guide disc 15 is arranged at the ends of the drum and interacts with guide wheel or guide pulley 16, 16' on the carriage 14, 14' in that said guide wheel or pulley runs along the circumference of the guide disc for mechanical control of the movement of the carriage when the drum 8 rotates. For the sake of simplicity, the guide disc is not shown in FIGS. 5–10.

As shown in FIGS. 2–4, the guide disc 15 has an almost oval or elliptical shape with its centre 15' lying at a distance above the axis 8' of the drum 8, as indicated more clearly in FIG. 4.

As shown in particular in FIGS. 3, 4 and 7, 8, the axis of rotation 8' of the drum is offset sideways relative to the conveying path given by the conveyor 2. However, this should not be understood as in any way defining the limits of the present invention, as the axis of rotation of the drum could, of course, also be centred above the longitudinal central axis of the conveyor 2.

From FIG. 2 it can be seen that the drum 8 is driven by a motor 17 via a gear 18 and via belt drive 19 and via a sheave 20 fastened to the drive shaft of the drum, here indicated by the reference numeral 21.

The solution of the device according to the invention illustrated in the figures provides an effective sideways movement of a container 10, either to one side or the other over the upper edge of the plate 11 or 12, depending upon the direction of rotation of the drum. If preceding detection of the container 10 has indicated that it should not be sorted to one side or the other of the device, the conveyor 2 will quite simply ensure that the container 10 is conveyed right through the chamber 9 for optional further treatment after it has passed the housing.

What is claimed is:

1. A device for controlling the conveying direction of liquid containers in the form of empty beverage cans or bottles of any cross-section, where the conveying direction is either along a conveying path through a portion of the device, or sideways away from the conveying path where the containers are supported in a horizontal position, characterised by a drum that is rotatably arranged above the conveying path and with its axis of rotation in the direction of the conveying path, wherein the drum has at least one container-adapted chamber, through-going in the direction of the axis of rotation, with its opening at the periphery of the drum, and so that there is thus also a container cross-section adapted opening in each of the end walls of the drum;

at least one a container guide plate extending sideways and upwards from the conveying path along a portion of the circumference of the drum; and a container ejection mechanism arranged in connection with said chamber, where the mechanism is so adapted that on mechanical operation it will empty the chamber when, as a consequence of the rotation of the drum, the chamber opening has moved passed an upper edge of the container guide plate, and thus with force will thrust a container lying in the chamber out of the chamber.

2. A device as disclosed in claim 1, characterised in that the mechanism consists of a radially movable carriage in the drum, where the carriage forms the back wall of the chamber with its radially outermost portion, and a stationary guide disc at the ends of the drum, the carriage having a guide wheel or pulley that interacts with the circumference of the guide disc for mechanical control of the movement of the carriage when the drum rotates.

3. A device as disclosed in claim 2, characterised in that the guide disc is given an oval or elliptical shape with its center lying at a distance above the axis of the drum.

4. A device as disclosed in claim 2, characterised in that the axis of rotation of the drum is offset sideways relative to the said conveying path.

5. A device as disclosed in claim 4, characterised in that the guide disc is given an oval or elliptical shape with its center lying at a distance above the axis of the drum.

6. A device as disclosed in claim 1, characterised in that the axis of rotation of the drum is offset sideways relative to the said conveying path.

* * * * *